United States Patent [19]

Taylor

[11] Patent Number: 4,738,339
[45] Date of Patent: Apr. 19, 1988

[54] ENERGY ABSORBER DEVICE WITH COMPOSITE PLASTIC CASING HAVING HIGH STRENGTH INNER CYLINDER

[75] Inventor: Paul H. Taylor, Grand Island, N.Y.

[73] Assignee: Tayco Developments, Inc., North Tonawanda, N.Y.

[21] Appl. No.: 4,260

[22] Filed: Jan. 5, 1987

Related U.S. Application Data

[63] Continuation of Ser. No. 709,537, Mar. 8, 1985, abandoned, which is a continuation-in-part of Ser. No. 370,738, Apr. 22, 1982, abandoned.

[51] Int. Cl.⁴ ............................. F16F 9/00; F16L 9/14
[52] U.S. Cl. ..................... 188/322.19; 92/170; 138/140; 138/153; 188/314; 188/316; 264/259; 267/64.13; 267/148; 428/36; 428/224
[58] Field of Search ................... 92/165–171; 428/35–36, 224; 188/322.16–322.22, 268, 269, 281, 282, 314–318, 322.12, 322.5; 293/133–136; 267/64.11–64.28, 116, 81, 120–129, 8 R, 35, 148–149, 152–153, 136–141.7, 63, 34, 151; 264/342 RE, 259–267, 271.1, 279, 279.1, 257, 258; 138/140–176; 156/166–172; 384/907–911; 248/631

[56] References Cited

U.S. PATENT DOCUMENTS

| | | | |
|---|---|---|---|
| 2,838,300 | 6/1958 | Gray | 188/316 X |
| 3,002,534 | 10/1961 | Noland | 138/153 X |
| 3,026,223 | 3/1962 | Vanderbilt et al. | 138/153 X |
| 3,040,712 | 6/1962 | Harrah | 92/170 X |
| 3,085,661 | 4/1963 | Takagi | 188/316 |
| 3,204,945 | 9/1965 | Taylor | 267/64.13 |
| 3,618,928 | 11/1971 | Taylor | 188/317 X |
| 3,703,125 | 11/1972 | Pauliukonis | 92/170 X |
| 3,706,615 | 12/1972 | Nishiyama et al. | 156/169 |
| 3,718,161 | 2/1973 | Woodson | 138/140 X |
| 3,722,640 | 3/1973 | Taylor | 188/316 |
| 3,726,368 | 4/1973 | Taylor | 188/316 |
| 3,740,291 | 6/1973 | Mallard | 264/262 X |
| 3,820,573 | 6/1974 | Carmody | 138/153 X |
| 3,874,544 | 4/1975 | Harmon | 138/140 X |
| 3,895,835 | 7/1975 | Thomson | 267/140 X |
| 3,933,344 | 1/1976 | Taylor | 188/316 X |
| 4,139,025 | 2/1979 | Carlström | 138/153 |
| 4,189,985 | 2/1980 | Harris | 92/170 X |
| 4,207,807 | 6/1980 | Takata et al. | 92/170 X |
| 4,265,344 | 5/1981 | Taylor | 267/64.13 X |
| 4,288,058 | 9/1981 | Inman | 264/262 X |
| 4,301,850 | 11/1981 | Schneider et al. | 264/262 X |
| 4,532,856 | 8/1985 | Taylor | 267/64.13 X |
| 4,582,303 | 4/1986 | Taylor | 267/64.13 |
| 4,585,099 | 4/1986 | Taylor | 188/322.19 |
| 4,603,712 | 8/1986 | Krause | 138/141 X |
| 4,627,472 | 12/1986 | Goettler et al. | 138/174 |

*Primary Examiner*—Douglas C. Butler
*Attorney, Agent, or Firm*—Joseph P. Gastel

[57] ABSTRACT

A fluid energy absorber device, such as a fluid spring or shock absorber, or a combination of both, having a composite casing of an outer cylinder of molded plastic around an inner high strength plastic cylinder having high strength fibers therein, the high strength fibers extending both longitudinally and circumferentially, with the circumferential fibers preferably being a high strength plastic which will permit the casing to expand radially. The inner cylinder may be a separate plastic cylinder containing the high strength fibers and to which the outer cylinder is bonded, or the inner cylinder may be formed by a matrix of plastic which is a continuation of the outer cylinder. The high strength cylinder may be located between inner and outer plastic cylinders which are fused to each other to encapsulate the high strength cylinder. A method of fabricating a fluid energy absorber device having a high strength composite casing including the steps of providing a tubular high strength inner member having high strength fibers therein, mounting the inner member on a mandrel, and forming an outer plastic cylinder about the inner member so that the resulting casing includes an outer plastic cylinder and an high strength inner cylinder having high strength fibers therein. The method may include mounting the high strength member on a plastic cylinder which was previously mounted on the mandrel, and thereafter forming the outer plastic cylinder so as to cause its ends to fuse to the ends of the inner plastic cylinder to encapsulate the high strength member.

35 Claims, 5 Drawing Sheets

ENERGY ABSORBER DEVICE WITH COMPOSITE PLASTIC CASING HAVING HIGH STRENGTH INNER CYLINDER

REFERENCE TO RELATED APPLICATION

The present application is a continuation of application Ser. No. 06/709,537 filed Mar. 8, 1985, now abandoned, which is a continuation-in-part of application Ser. No. 370,738, filed Apr. 22, 1982, now abandoned.

BACKGROUND OF THE INVENTION

The present invention relates to an improved fluid energy absorber device, such as a fluid spring or shock absorber, or combination of both, having a composite plastic casing which approaches the performance of an energy absorber device having a metal casing without being subject to variations in ambient temperature of the latter, and without being subject to the low spring rates normally associated with energy absorber devices having plastic casings.

Fluid energy absorber devices having plastic casings are disclosed in U.S. Pat. Nos. 3,618,928 and 4,265,344. In the former patent there is also disclosed an energy absorber device with a inner plastic cylinder reinforced by an external filament winding, which is not embedded in the plastic. It is with an improvement over energy absorber devices, such as shown in the foregoing patents, that the present invention is concerned.

SUMMARY OF THE INVENTION

It is one object of the present invention to provide an improved fluid energy absorber device having a composite plastic casing which causes the characteristic of the energy absorber device to approach the performance characteristics of heavier fluid energy absorber devices having metal casings, but without the weight and variations in the characteristics of such metal energy absorber devices in response to temperature changes, and without the low spring rate of fluid energy absorber devices having plastic casings.

Another object of the present invention is to provide a fluid energy absorber device having a composite casing which can be fabricated at a relatively low cost by a molding operation.

A further object of the present invention is to provide an improved method for fabricating a fluid energy absorber device having a composite plastic casing.

Yet another object of the present invention is to provide a fluid energy absorber device completely fabricated of plastic and fibers which are hard to detect by radar because component materials have no radar signature.

Another object of the present invention is to provide a nonmetallic fluid energy absorber device which can operate in environments hostile to metal elements.

A further object of the present invention is to provide an improved plastic casing for an energy absorber device wherein a high strength cylinder containing high strength fibers in a matrix is encapsulated between inner and outer plastic cylinders so that the high pressures to which the device is subjected will not cause separation between the high strength fibers and the matrix of the high strength cylinder. Other objects and attendant advantages of the present invention will readily be perceived hereafter.

The present invention relates to a fluid energy absorber device comprising a composite casing, compressible fluid in said composite casing, and a piston in said composite casing, said composite casing comprising a plastic inner cylinder and a plastic outer cylinder molded about said inner cylinder, said inner cylinder being fabricated of a material of greater strength than said outer cylinder.

The present invention also relates to a method of fabricating a high strength composite casing for a fluid energy absorber device comprising the steps of providing a tubular high strength inner member, mounting said inner member on a mandrel, and forming an outer plastic cylinder about said inner member.

The present invention also relates to a fluid energy absorber device comprising a composite plastic casing, fluid in said composite plastic casing, and a piston in said composite plastic casing, said composite plastic casing comprising an inner plastic cylinder, a central cylinder containing high strength fibers surrounding said inner plastic cylinder, and an outer plastic cylinder surrounding said central cylinder, said inner and outer plastic cylinders having end portions which are fused to each other to thereby encapsulate said central cylinder therebetween.

The present invention also relates to a method of fabricating a high strength composite casing for a fluid energy absorber device comprising the steps of providing an inner plastic cylinder, mounting said inner plastic cylinder on a mandrel, mounting a high strength central cylinder on said inner plastic cylinder, and molding an outer plastic cylinder around said central cylinder and causing the ends of said outer plastic cylinder to fuse with the ends of said inner plastic cylinder.

The various aspects of the present invention will be more fully understood when the following portions of the specification are read in conjunction with the accompanying drawings wherein:

DESCRIPTION OF THE PREFERRED EMBODIMENTS

Figures 1, 1A, 2, 3, 4, 5, 6, 7:
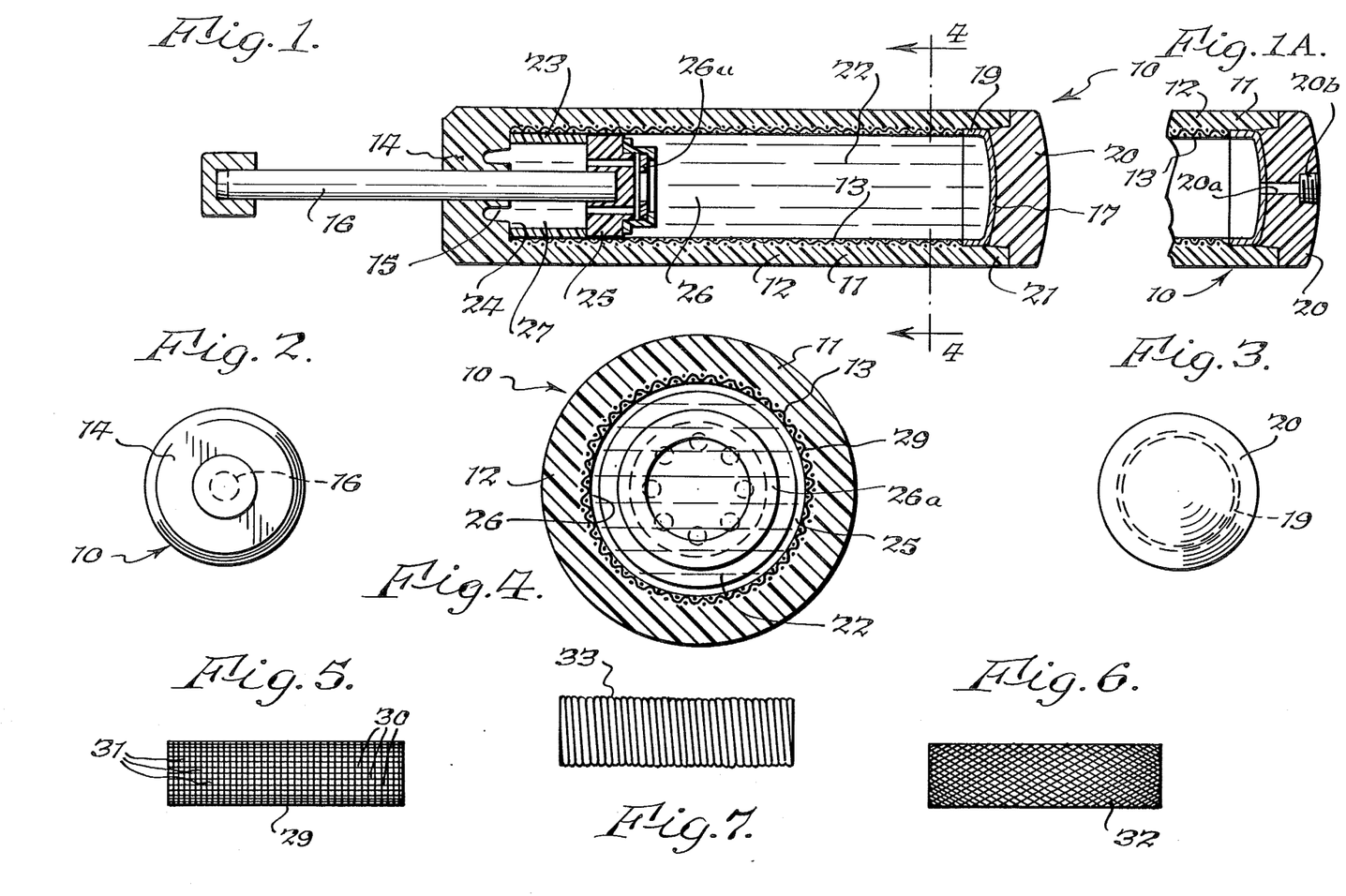
FIG. 1 is a cross sectional view of the improved fluid energy absorber device of the present invention.
FIG. 1A is an alternate construction of the end of the cylinder.
FIG. 2 is an end view taken from the left of FIG. 1.
FIG. 3 is an end view taken from the right of FIG. 1.
FIG. 4 is a cross sectional view taken substantially along line 4—4 of FIG. 1.
FIG. 5 is a side elevational view of one type of high strength sleeve which can be used in the formation of the inner cylinder.
FIG. 6 is a side elevational view of another type of sleeve which can be used in the formation of the inner cylinder.
FIG. 7 is a side elevational view of still another form of sleeve which can be used in the formation of the inner cylinder.

The improved fluid energy absorber device is shown at 10 in FIG. 1. The fluid energy absorber device 10 may be a fluid spring or a fluid shock absorber, or a combination of both, and the fluid utilized therein may be a liquid or a gas or a combination of both. Accordingly, the designation "fluid energy absorber device" will encompass all of the foregoing.

Energy absorber 10 includes a casing 11 which is essentially a composite cylinder formed of an outer cylinder 12 of plastic surrounding an inner cylinder 13 which contains high strength fibers embedded in a matrix formed of the same or other material than outer cylinder 12. The piston sealing end 14 of member 10 is molded integrally with outer cylinder 12 and it includes an annular integral seal 15 which receives piston 16 in sealing relationship. This construction is shown in U.S. Pat. No. 4,265,344, which is incorporated herein by reference. A high strength metal cap 17 having an annular flange 19 is mounted at the opposite end of casing 11 and is retained in position by a plastic plug 20 which may be secured in position with the end portion 21 of casing 11 by means of spin-welding, friction-welding, by means of a suitable adhesive, or in any other manner. It will be appreciated that end closure 17 and end cap 20 are assembled onto casing 11 after the energy absorber device, which is represented as a liquid spring, has been filled with a suitable compressible liquid 22, such as a silicone liquid. Alternatively, as shown in FIG. 1A, a filling bore 20a may be molded into cap 20 and subsequently closed by plug 20b if the compressible liquid is incompatible with the adhesive or the welding process. An annular sleeve 23 is located between shoulder 24 and dampening head 25 secured to the end of piston 16. The dampening head includes a movable annular valve member 26a which restricts flow of liquid from chamber 26 to chamber 27 when piston 16 is moving to the right but permits the piston 16 to move to the left in a relatively unimpeded manner to provide a quick return, as is well known. Except for the composite casing 11, the liquid spring with its integral molded seal 15, may be identical in all respects to that shown in U.S. Pat. No. 4,265,344, which is incorporated herein by reference.

The outer cylinder 12 and ends 14 and 20 are molded of a suitable plastic, such as nylon or Delrin, but they are not limited thereto. In accordance with the present invention, casing 11 includes a high strength inner cylinder 13 within outer cylinder 12. Inner cylinder 13 includes a sleeve 29 (FIG. 5) of suitable high strength fibers. Preferably the fibers 30 which extend longitudinally of casing 11 are of a high strength with longitudinal stiffness, such as graphite, steel, aluminum, titanium, boron, fiberglass, or the like. The fibers 31 which extend circumferentially and which may be interwoven with the longitudinal fibers are preferably fabricated from high strength plastic, such as aramid (known as Kevlar), which permits expansion of casing 11 in a radial direction. This will provide the strength to resist substantial bottoming loads of a suspension while permitting thermal and load expansion in a radial direction while providing high circumferential strength. During the formation of the outer cylinder 12 during the molding process, the plastic of outer cylinder 12 will enter the spaces between the fibers 30 and 31 and thus form a matrix therefor so that the plastic of outer cylinder 12 and that in inner cylinder 13 will be one continuous matrix.

It will be appreciated that permitting the inner cylinder 13 to expand radially, primarily because of the stretchability of circumferential high strength fibers 31, will cause casing 11 to provide additional spring action while maintaining the same load carrying capacity under different temperature conditions. By placing the high strength reinforcement fibers in the inner sleeve 13, the casing 11 can have approximately twice the load carrying capacity than if the reinforcement was on the outer portion of outer cylinder 11, as shown in U.S. Pat. No. 3,618,928.

In FIG. 6 a modified plastic cylindrical sleeve 32 is shown which is woven of braided plastic monofilament, such as aramid or high tensile strength metal wire. The weaving is such that if forces are applied toward each other at the opposite ends of sleeve 32, it will expand in diameter so that it can be mounted on several sizes of mandrels which may be used in the formation of the composite casing 11. When the forces are removed, the sleeve 32 will elongate and tightly grip the mandrel on which it is mounted during fabrication of the composite casing, as described in greater detail relative to FIGS. 12–14. Aside from this difference, a liquid spring utilizing an inner sleeve 32 is fabricated in the same manner as the liquid spring of FIG. 1.

In FIG. 7 a sleeve 33 is shown which is formed of helically wound high strength metal wire or plastic monofilament. This sleeve 33 is shown as a portion of an inner sleeve 34 in FIG. 8. As with the embodiments of FIGS. 5 and 6, sleeve 34 is mounted on a mandrel and thereafter the outer cylinder 12 of casing 11 is molded around and between it so as to provide an inner sleeve 13' which is analogous to inner sleeve 13 of FIG. 1. If the sleeve 33 is formed of metal, the casing will be able to carry higher loads than if aramid fiber was used, but the construction would lose some of its temperature compensating advantages. To obtain good adhesion of a metal spring 33 to the outer plastic sleeve, the coil spring can be coated with a plastic either in a bath or by chrome plating, or by reverse etching and heating the spring and immersing it in a fluidized bed of powdered plastic.

Figure 8:
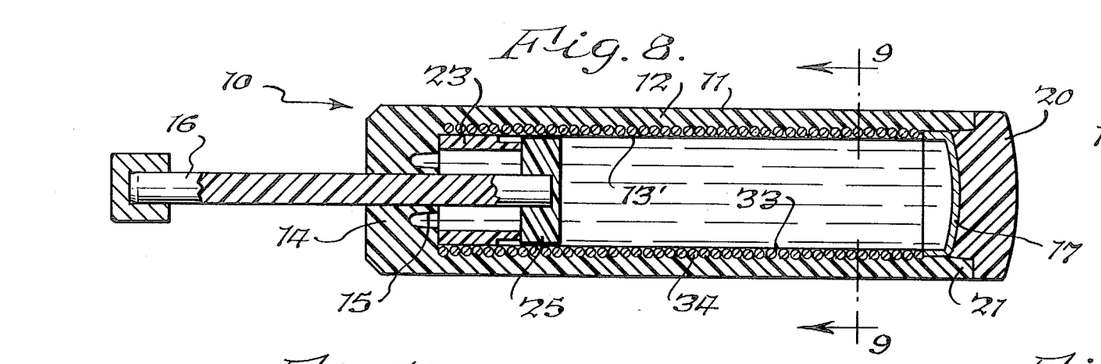
FIG. 8 is a cross sectional view of a liquid spring which includes an inner cylinder formed from the sleeve of FIG. 7 and includes a composite plastic piston rod and shock head.
Figure 9:
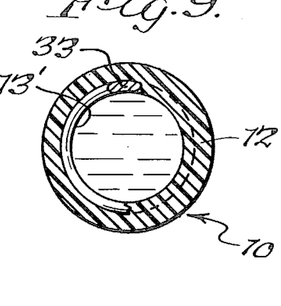
FIG. 9 is a cross sectional view taken substantially along line line 9—9 of FIG. 8.

In FIG. 8 a complete composite plastic fluid energy absorber device is shown which is completely fabricated of composites including composite plastic piston rod 16 and shock head 25. Piston rod 16 and shock head 25 may be fabricated of an epoxy resin having fibers of graphite and/or fiberglass oriented longitudinally therein. A composite device of this type does not produce a radar reflection and is therefore preferred for many defense uses. The fluid energy device of FIG. 8 is desirable when the product must exist in a hostile atmosphere for metals such as deep in the sea or immersed in hot corrosive oil as a tank transmission, or in plating or other chemical solutions.

Figure 12:
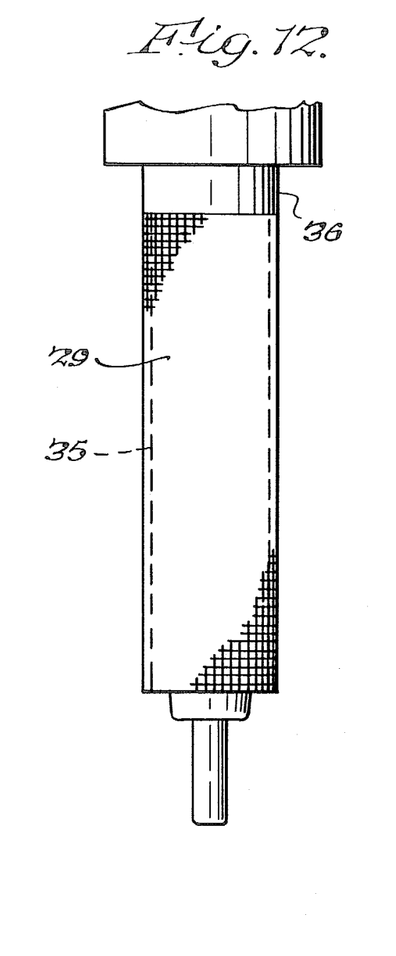
FIG. 12 shows a mandrel of a plastic molding machine carrying a tubular sleeve, such as shown in FIG. 5.
Figure 13:
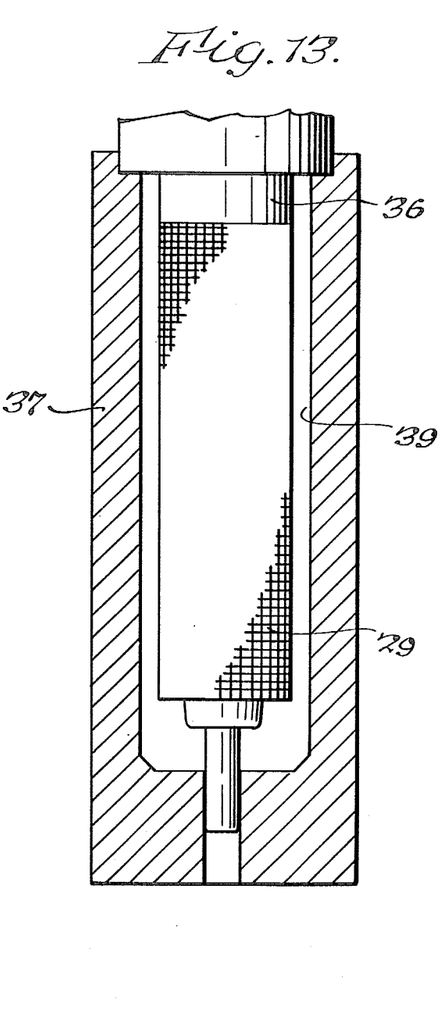
FIG. 13 shows the mandrel and sleeve of FIG. 12 inserted into a molding die in which a composite cylinder is molded.
Figure 14:
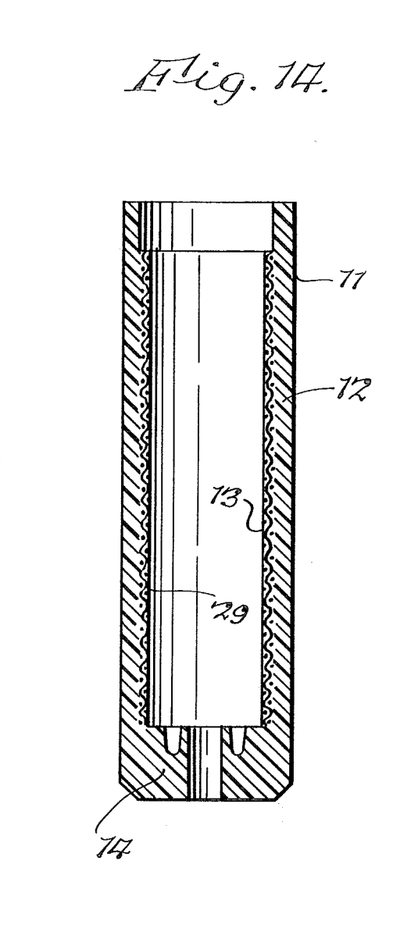
FIG. 14 shows the casing which is formed in the die of FIG. 13.

The above described method of forming a composite casing 11, such as shown in FIGS. 1 and 14, is clearly illustrated in FIGS. 12 and 13. In this respect, in FIG. 12, a sleeve, such as 29, is shown in mounted relationship on the portion 35 of mandrel 36. In FIG. 13 mandrel 36 with sleeve 29 mounted thereon is shown in position in mold 37 having cavity 39 into which plastic is injected to provide the outer cylinder 12 which also forms the matrix around the sleeve 29 of inner cylinder 13, as shown in FIGS. 1 and 14.

Figure 15:
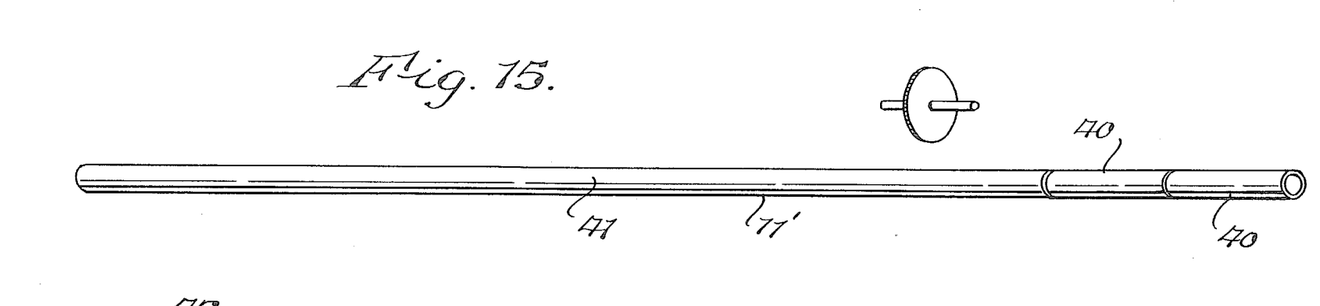
FIG. 15 is a diagrammatic view showing a tubular inner cylinder being cut from a tube of indeterminate length.
Figure 16:
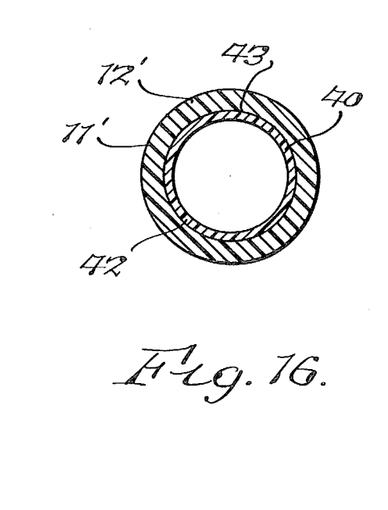
FIG. 16 is a cross sectional view similar to FIG. 4 but showing the cutoff tube of FIG. 15 embedded within the outer cylinder formed in a molding machine.

In FIGS. 15 and 16, an alternate method of forming a composite casing, such as 11', is shown. This method comprises severing a predetermined length of tubing 40 from tubing 41 of indeterminate length. Tubing 41 may consist of metal, preferably a high thermal expansion metal such as aluminum, but the most desirable cylinder reinforcing material consists of high strength fibers of any desired type such as mentioned above which are bonded in a suitable resin matrix 42. The resin may be a suitable epoxy. Preferably normal commercial width woven monofilament fiber cloth or paper containing a high strength monofilament, such as aramid filaments, is commercially wound at high speeds on automatic equipment over a polished properly sized mandrel to provide a perfect bore for the shock absorber head. This tubing is then cut off to the proper lengths in high speed cut off saws to provide a low cost composite inner cylinder. The tubular member 40 is then mounted on a mandrel, such as 36, shown in FIG. 12. Thereafter, an outer cylinder 12', which is analogous to outer cylinder 12 of FIG. 1, is molded in a mold, such as 37, around tubular member 40 to which it is bonded at interface 43. The use of aramid paper or cloth tubes, such as described above relative to FIGS. 15 and 16, with or without a resin binder, provides a low cost, high strength reinforcement for a plastic liquid spring suitable for the automotive vehicle industry. In such a spring the expansion and contraction of the casing 11 (which includes outer cylinder 12 and inner cylinder 13) will match the expansion and contraction of the compressible liquid 22, so that when the liquid springs are used for a vehicle suspension, the suspension will not rise and fall with changes in ambient temperature, thereby obviating the necessity of an external pumping system which is utilized with hydropneumatic suspensions or liquid springs having a metal casing used in vehicle and truck suspensions.

Whenever metal fibers are utilized as part of the inner cylinder 13, it is desirable to chrome-plate the fibers, reverse etch them and subject the metal parts to a fluidized bed of granular plastic, to thereby enhance the bond between the plastic of the outer cylinder 12, and such metal parts. If plastic fibers are used in the inner cylinder 13, the melting temperature of such fibers must exceed the melting temperature of the outer cylinder material.

Figure 10:
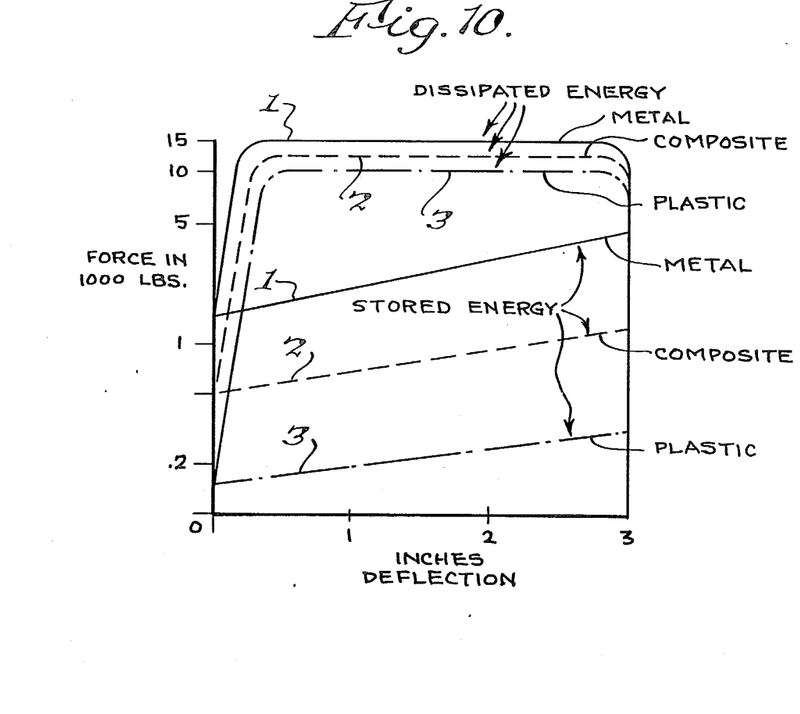
FIG. 10 is a graph illustrating the energy storage and dissipation capabilities of a liquid spring utilizing a composite cylinder of the present invention, as compared to a coil spring, and a liquid or hydropneumatic spring having a metallic cylinder.

In FIG. 10 there is a comparison of force versus deflection for a liquid spring with a steel cylinder (graphs 1), a liquid spring having a composite cylinder of the present invention (graphs 2), and a liquid/gas liquid spring (graphs 3). From the graphs it can readily seen that the stored energy in a plastic liquid spring is relatively low, yet the dissipated energy closely approaches that of a liquid spring having a metal housing. The reason that the dissipated energy of the plastic liquid spring is relatively high is because the plastic outer cylinder will not yield enough to reduce shock force but it will deflect elastically to provide low spring force. Conversely, the composite liquid spring of graph 2 almost equals the steel liquid spring in both stored energy and dissipated energy, but it weighs only about half of the steel liquid spring. This is very desirable for aerospace or defense applications subject to high temperature variations or radar visibility.

Figure 11:
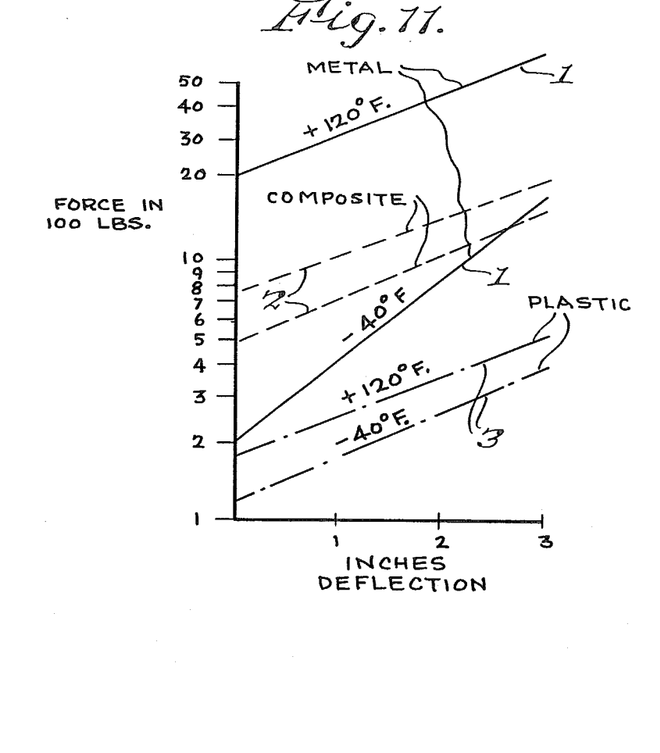
FIG. 11 is a graph showing the effect of temperature on the load carrying capabilities of the liquid spring of the present invention as against a liquid spring having a metal cylinder.

In FIG. 11 there is a graph of force versus deflection at different temperatures for a liquid spring with a metal cylinder (graph 1), a plastic liquid spring of the present invention (graphs 2) and a pure plastic liquid spring (graphs 3). It can readily be seen from graphs 1 that there is a relatively great difference in the amount of deflection at different forces for a conventional metal housed liquid spring between the temperature of −40° F. and +100° F. In contrast to this, in a composite liquid spring of the present invention (graphs 2), there is relatively little variation between −40° F. and 120° F. as compared with the steel springs (graphs 1). Therefore, it is quite apparent that the liquid spring of the present invention is virtually unaffected by changes in ambient temperature, especially as compared to a liquid spring having the conventional metal housing. The reason is because the housing of the plastic liquid spring and the compressible liquid therein expand substantially at the same rate. Therefore, the deflection will remain substantially constant at different temperatures while providing substantially the energy storage and dissipation of the metal liquid spring.

Figure 17:
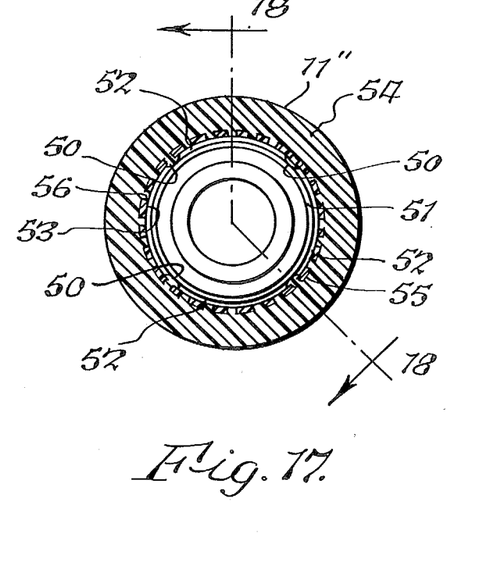
FIG. 17 is a cross sectional view of an alternate embodiment of the invention taken substantially along line 17—17 of FIG. 18.
Figure 18:
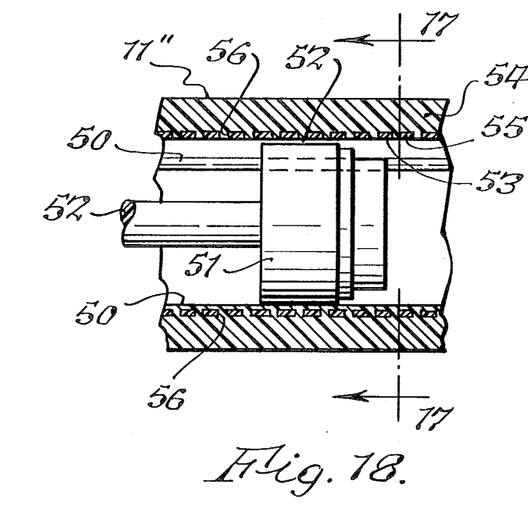
FIG. 18 is a fragmentary cross sectional view taken substantially along line 18—18 of FIG. 17.

In FIGS. 17 and 18 a further modified embodiment of the present invention is disclosed. The composite casing 11″ is analogous to casing 11 of FIG. 1, but it differs structurally therefrom in that a plurality of ribs 50 extend longitudinally of the internal surface casing 11″ substantially throughout its length to guide dampening head 51, which may be identical in structure to dampening head 25 (FIG. 1) which is attached to piston 52, which is analogous to piston 16 (FIG. 1). This permits a plurality of annular spaces 52 to be present between the outer periphery of dampening head 51 and the inner surface 53 of casing 11″. The guiding ribs 50 are formed of the same material as outer cylinder 54 during the molding process because the mandrel on which inner cylinder 55 is mounted possesses slots therein which receive the molded plastic which enters these slots through the apertures 56 in the fabric or tubing which forms inner cylinder 53. By adjusting the depth of ribs 50, the required clearance or bypass may be obtained to meet different dampening conditions.

Relative to FIGS. 17 and 18, in U.S. Pat. No. 3,722,640, there are disclosed protuberances on the fluidic amplified piston head to center it, so the flow of fluid is uniformly and smoothly amplified around the fluidic head. In high production methods these protuberances are upset, and in lower production methods these protuberances are inserted into drilled holes in the piston head. It is well known that if a metering pin bears to one side, flow increases 50% even though the clearance area is the same. In experiments with fluidic heads, proper centering was found to be essential to fluid amplified flow. In accordance with this invention, there is disclosed the structure of FIGS. 17 and 18 for obtaining the centering of a fluidic amplified head to control the fluidic amplified flow, and thus the fluidic head can be a simple machined part because the centering is accomplished by the guiding ribs 50 of FIGS. 17 and 18.

In FIGS. 19–22 a modified embodiment of the present invention is disclosed. The fluid energy absorber device 60 is of the same general type described above relative to the preceding figures. It includes a casing 61 which is a composite cylinder formed of an outer cylinder 62 of plastic material surrounding a central cylinder 63 of high strength material which surrounds an inner cylinder 64 of plastic material. Central cylinder 63 may contain high strength fibers embedded in a matrix formed of the same or other material than cylinders 62 and 64, or it may comprise high strength filaments, as explained previously. The central cylinder 63 may contain high strength fibers in the configurations shown in any of the preceding figures including FIGS. 1, 5, 6, 7 and 8. The material of inner and outer cylinders 62 and 64 is preferably the same so that during the process of forming casing 61, the inner and outer cylinders 64 and 62, respectively, will fuse to each other about the annular ends 65 and 66 of central cylinder 63 to thereby completely encapsulate central cylinder 63 and thus inner cylinder 64 will provide an impervious barrier between the high pressure fluid 87 in the energy absorber and the central cylinder 63 and thus eliminate any tendency for separation to occur between the high strength fibers and any plastic matrix of central cylinder 63. As can be seen, central cylinder 63 is much closer to the internal surface 67 of casing 61 than to the outer surface 69 thereof, thereby providing the advantages of the construction of the embodiments of FIGS. 1–18.

Figure 19:
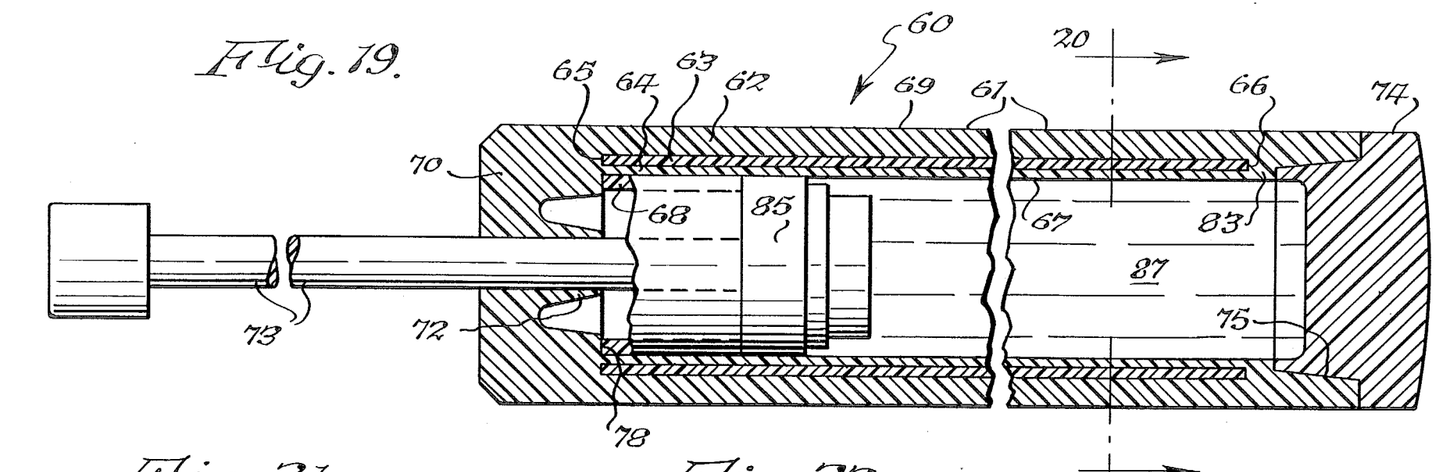
FIG. 19 is a fragmentary cross sectional view of a modified embodiment of the improved energy absorber device of the present invention.
Figure 20:
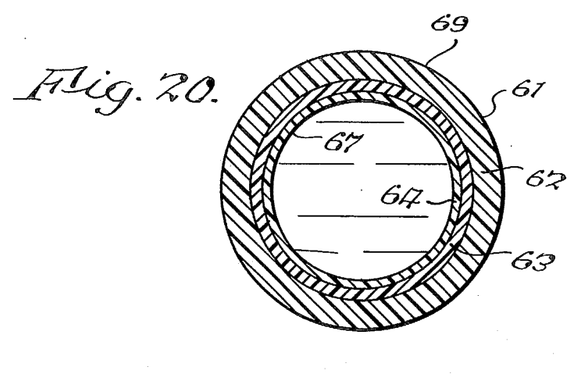
FIG. 20 is a cross sectional view taken substantially along line 20—20 of FIG. 19.

Aside from the foregoing structure, the fluid energy absorber device 60 contains structure which is analogous to the structure of FIG. 1. In this respect, fluid energy absorber device 60 includes a piston sealing end 70 molded integrally with outer cylinder 62 and fused integrally with the end portion 71 of inner cylinder 64. Piston sealing end 14 includes an integral annular seal 72 which receives piston 73 in sealing relationship. The annular lip 72 is fully described in U.S. Pat. No. 4,265,344, which is incorporated herein by reference.

An end plug 74 is suitably secured within opening 75 of casing 61, as by spin-welding, friction-welding, means of a suitable adhesive, or any other manner. An annular sleeve 68, which is analogous to sleeve 23 of FIG. 1, is located in casing 61 between shoulder 78 and piston head 85.

Figures 21, 22, 23:
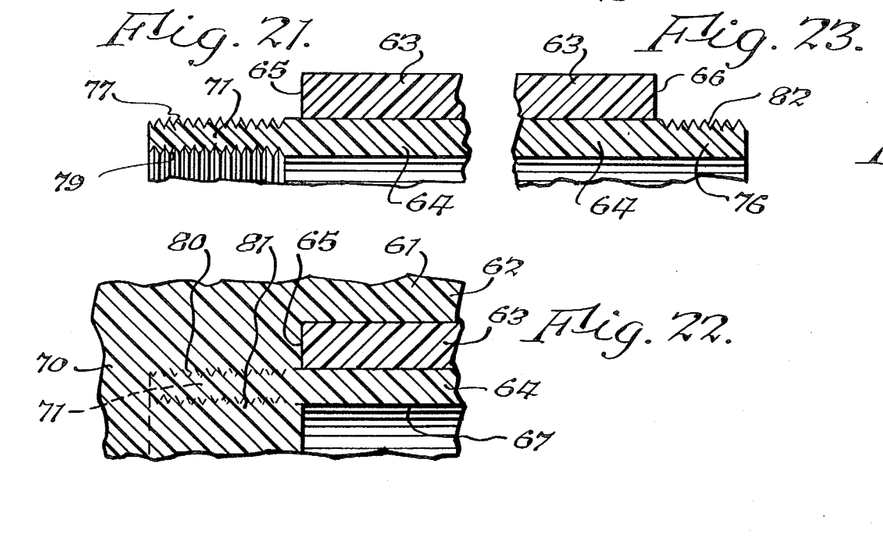
FIG. 21 is a fragmentary cross sectional view of a portion of one end of the inner plastic cylinder with a cylinder of high strength material positioned thereon prior to the molding of the outer plastic cylinder onto the inner plastic cylinder.
FIG. 22 is a fragmentary cross sectional view similar to FIG. 21 but showing the outer plastic sleeve molded to the inner plastic sleeve sandwiching the sleeve of high strength material therebetween.
FIG. 23 is a fragmentary cross sectional view of a portion of the opposite end of the inner plastic cylinder from that shown in FIG. 21 with a cylinder of high strength material positioned thereon prior to the molding of the outer plastic cylinder onto the inner plastic cylinder.

The casing 61 is formed in the following manner. Inner sleeve 64 is mounted on a mandrel, such as 35 (FIG. 12), and central cylinder 63 is mounted on inner cylinder 64. The end portion 71 of inner cylinder 64 will protrude beyond end 65 of central cylinder 63 (FIG. 21), and the end portion 76 of inner cylinder 64 will extend beyond the end portion 66 of cylinder 63 (FIG. 23). With cylinders 63 and 64 so oriented on mandrel 35, mandrel 36 is inserted into mold 37 to the position shown in FIG. 13. Plastic material is then injected into cavity 39 of mold 37. The plastic will thus form outer cylinder 62 and it will also fuse with ends 71 and 76 of inner cylinder 64 to provide a homogeneous mass completely surrounding central cylinder 63, thereby completely encapsulating the latter.

As can be seen from FIG. 21, end 71 of inner cylinder 64 has external annual ridges 77 and internal annular ridges 79. The adjacent portions 80 and 81 of end cap 70, which is formed integrally with outer cylinder 62, will enter the grooves between ridges 77 and 79 during the process of fusing to end portion 71, to thereby insure an extremely strong impervious connection between end portions 71 and end cap 70. The outer surface 82 of end portion 76 also has annular ridges to insure a good connection between outer cylinder 62 and inner cylinder 64 in the area 83. Instead of ridges 77, 79 and 82, as shown, those portions may be roughened in any other suitable manner to enhance fusion between the inner and/outer cylinders.

The complete encapsulation of central cylinder 63 thus provides a casing for a fluid energy absorber device wherein the internal forces within the energy absorber device will be applied against homogeneous internal surface 67, thereby obviating any tendency for separation between the high strength fibers in central cylinder 63 and the matrix in which they are embedded.

By way of dimensions, in a specific construction inner cylinder 64 was 5/64 inches thick, central cylinder 63 was 5/64 inches thick, and outer cylinder 62 was ¼ inches thick. It can thus be seen that the central cylinder 63 is located closer to inner surface 67 than to the outer surface of outer cylinder 62. Furthermore, it is preferred that the inner cylinder 64 and outer cylinder 62 be formed of the same plastic so that there is good fusion between them during the molding process. The inner cylinder 64 and outer cylinder 62 are preferably formed of nylon or DELRIN®, or may be formed of any other suitable plastic.

It is intended that the advantageous low cost, high strength construction of the present invention be utilized with other energy absorber devices such as the liquid gas spring of U.S. Pat. No. 3,204,945 and the fluidic amplified hydrapneumatic spring-shock or reduced volume spring-shock of U.S. Pat. Nos. 3,722,640 and 3,726,368: While spring force and pressure is low for many such applications, the higher strength composite filament and inner cylinder of the present invention is suitable where high shock forces and pressures are generated from a shock load such as when a vehicle shock absorber is subjected to the shock resulting from a vehicle wheel hitting a pothole.

While the specific examples discussed above have been liquid springs, it will be appreciated, as stated previously, that the principles of the present invention are applicable to all types of fluid energy absorber devices, which include fluid springs and fluid shock absorbers, or a combination of both, containing either a liquid or gas, or a combination of both.

While preferred embodiments of the present invention have been disclosed, it will be appreciated that the present invention is not limited thereto but may be otherwise embodied within the scope of the following claims.

What is claimed is:

1. A fluid energy absorber device comprising a composite plastic casing, fluid in said composite plastic casing, and a piston in said composite casing, said composite casing comprising an inner plastic cylinder and a plastic outer cylinder molded about said inner cylinder, said inner plastic cylinder including reinforcement material to cause it to be of greater strength than said outer cylinder.

2. A fluid energy absorber device as set forth in claim 1 wherein said reinforcement material in said inner cylinder includes high strength fibers.

3. A fluid energy absorber device as set forth in claim 2 wherein said high strength fibers are in the form of a tube separate from said outer cylinder.

4. A fluid energy absorber device as set forth in claim 2 wherein said fibers are embedded in a resin which comprises said inner cylinder.

5. A fluid energy absorber device as set forth in claim 4 wherein said fibers include first fibers extending longitudinally of said inner cylinder and second fibers extending circumferentially of said inner cylinder.

6. A fluid energy absorber device as set forth in claim 5 wherein said second fibers are formed of continuous plastic having the ability to permit radial expansion of said inner cylinder due to the applicaiton of thermal and load forces while providing high circumferential strength.

7. A fluid energy absorber device as set forth in claim 5 wherein said first fibers are of sufficient length and of relatively great longitudinal stiffness to resist substantial bottoming loads.

8. A fluid energy absorber device as set forth in claim 7 wherein said second fibers are formed of continuous plastic having the ability to permit radial expansion of said inner cylinder due to the application of thermal and load forces while providing high circumferential strength.

9. A fluid energy absorber device as set forth in claim 7 wherein said first fibers are selected from the group of graphite, steel, boron, titanium, aluminum and fiberglass.

10. A fluid energy absorber device as set forth in claim 7 wherein said first fibers are metal.

11. A fluid energy absorber device as set forth in claim 2 wherein said high strength fibers are embedded in the matrix of the plastic of said inner cylinder.

12. A fluid energy absorber device as set forth in claim 11 wherein said fibers include first fibers extending longitudinally of said inner cylinder and second fibers extending circumferentially of said inner cylinder.

13. A fluid energy absorber device as set forth in claim 12 wherein said second fibers are formed of continuous plastic having the ability to permit radial expansion of said inner cylinder due to the application of thermal and load forces while providing high circumferential strength.

14. A fluid energy absorber device as set forth in claim 11 wherein said first fibers are of sufficient length and of relatively great longitudinal stiffness to resist substantial bottoming loads.

15. A fluid energy absorber device as set forth in claim 14 wherein said second fibers are formed of continuous plastic having the ability to permit radial expansion of said inner cylinder due to the application of thermal and load forces while providing high circumferential strength.

16. A fluid energy absorber device as set forth in claim 14 wherein said first fibers are selected from the group of graphite, steel, boron, titanium, aluminum and fiberglass.

17. A fluid energy absorber device as set forth in claim 14 wherein said first fibers are metal.

18. A fluid energy absorber device as set forth in claim 2 wherein said high strength fibers are formed of continuous plastic and extend circumferentially and have the ability to permit radial expansion of said inner cylinder due to the application of thermal and load forces while providing high circumferential strength.

19. A fluid energy absorber device as set forth in claim 1 wherein said piston includes a piston rod, first and second end walls in said casing, said piston rod extending through said first end wall, and a metal cap forming a liner of said second end wall.

20. A fluid energy absorber device as set forth in claim 1 wherein said outer cylinder comprises plastic without reinforcement material therein.

21. A fluid energy absorber device comprising a composite plastic casing, fluid in said composite plastic casing, and a piston in said composite casing, said composite casing comprising an inner plastic cylinder and a plastic outer cylinder molded about said inner cylinder, said inner plastic cylinder including reinforcement material to cause it to be of greater strength than said outer cylinder and plastic ribs extending radially inwardly from the inner surface of said inner plastic cylinder.

22. A fluid energy absorber device as set forth in claim 21 wherein said plastic ribs are formed of the same material as the plastic of said outer cylinder.

23. A fluid energy absorber device as set forth in claim 22 wherein said inner plastic cylinder includes openings therein through which the plastic material of said outer cylinder extends to form said ribs.

24. A fluid energy absorber device comprising a composite plastic casing, fluid in said composite plastic casing, and a piston in said composite plastic casing, said composite plastic casing comprising an inner plastic cylinder defining an impervious barrier to said fluid, a central cylinder containing high strength fibers surrounding said inner plastic cylinder, and an outer plastic cylinder surrounding said central cylinder, said high strength fibers of said central cylinder causing it to have greater strength than said outer cylinder, said inner and outer plastic cylinders having end portions which are fused to each other to thereby encapsulate said central cylinder therebetween.

25. A fluid energy absorber device as set forth in claim 24 wherein said fibers are embedded in a resin.

26. A fluid energy absorber device as set forth in claim 25 wherein said fibers are continuous and extend substantially the entire length of said central cylinder.

27. A fluid energy absorber device as set forth in claim 24 wherein said high strength fibers in said central cylinder include continuous plastic fibers extending circumferentially in said central cylinder having the ability to permit radial expansion of said central cylinder due to the application of thermal and load forces while providing high circumferential strength.

28. A fluid energy absorber device as set forth in claim 27 wherein said high strength fibers in said central cylinder include second fibers extending longitudinally thereof.

29. A fluid energy absorber devices set forth in claim 28 wherein said second fibers are of sufficient length and of relatively great longitudinal stiffness to resist substantial bottoming loads.

30. A fluid energy absorber device as set forth in claim 29 wherein said second fibers are selected from the group of graphite, steel, boron, titanium and fiberglass.

31. A fluid energy absorber device as set forth in claim 29 wherein said second fibers are continuous and extend substantially the entire length of said central cylinder.

32. A fluid energy absorber device as set forth in claim 24 wherein said end portions of said inner cylinder have outer surfaces which are rough to enhance fusion with said outer cylinder.

33. A fluid energy absorber device as set forth in claim 24 wherein said inner cylinder has an inner surface and wherein said outer cylinder has an outer surface, and wherein said central cylinder is closer to said inner surface than to said outer surface.

34. A fluid energy absorber device as set forth in claim 24 wherein said piston includes a piston rod, first and second end walls in said casing, said piston rod extending through said first end wall, and a metal cap forming a liner of said second end wall.

35. A fluid energy absorber device as set forth in claim 24 wherein said inner and outer cylinders comprise plastic without reinforcement material therein.

* * * * *